(No Model.) 3 Sheets—Sheet 1.
J. CAMPBELL.
COOKING UTENSIL.
No. 284,608. Patented Sept. 11, 1883.
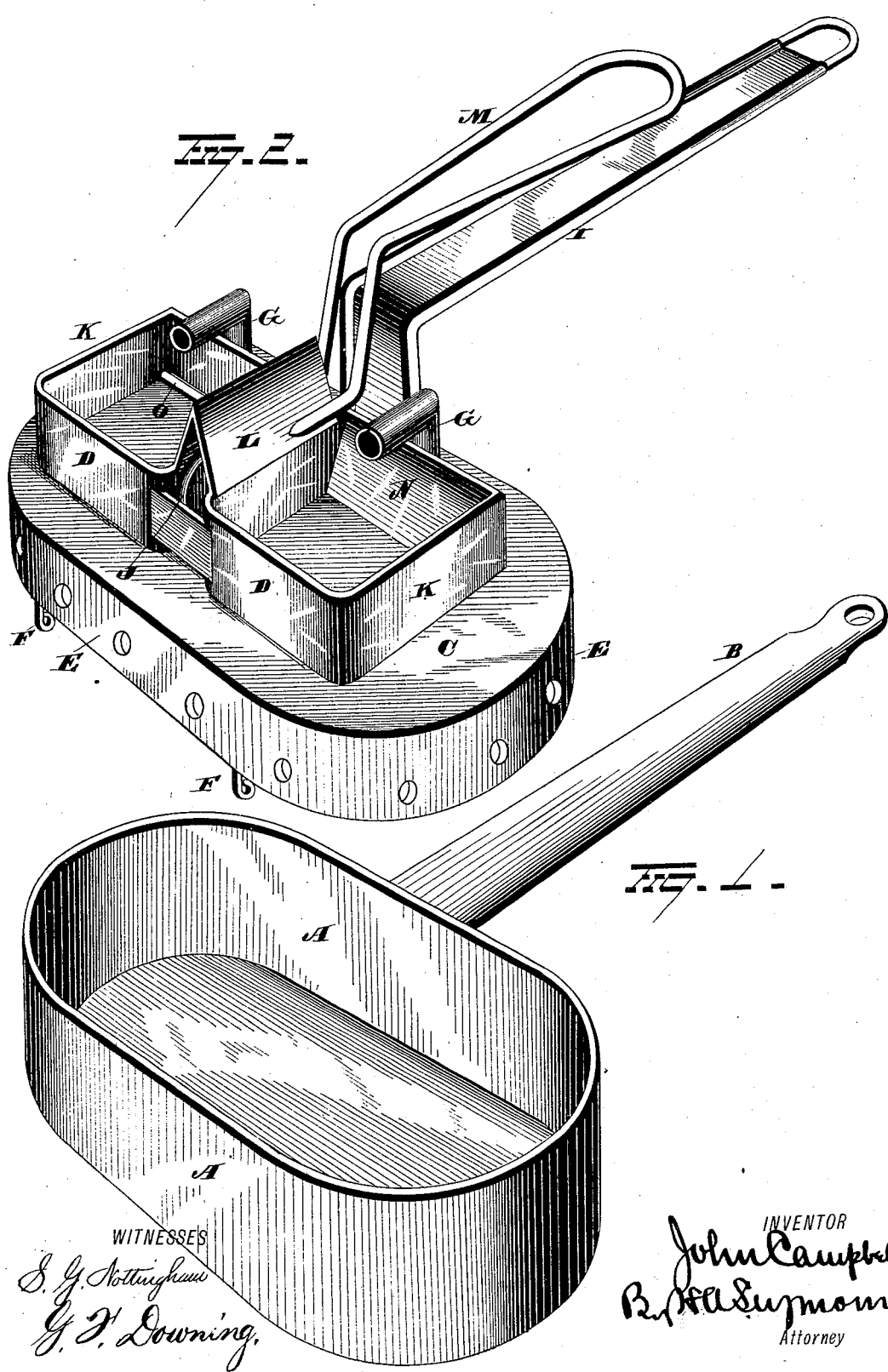
WITNESSES
S. G. Nottingham
G. F. Downing
INVENTOR
John Campbell
By H. A. Seymour,
Attorney (No Model.) 3 Sheets—Sheet 2.

J. CAMPBELL.
COOKING UTENSIL.

No. 284,608. Patented Sept. 11, 1883.

WITNESSES
S. G. Nottingham
G. F. Downing

INVENTOR
John Campbell
By H. A. Symons
Attorney

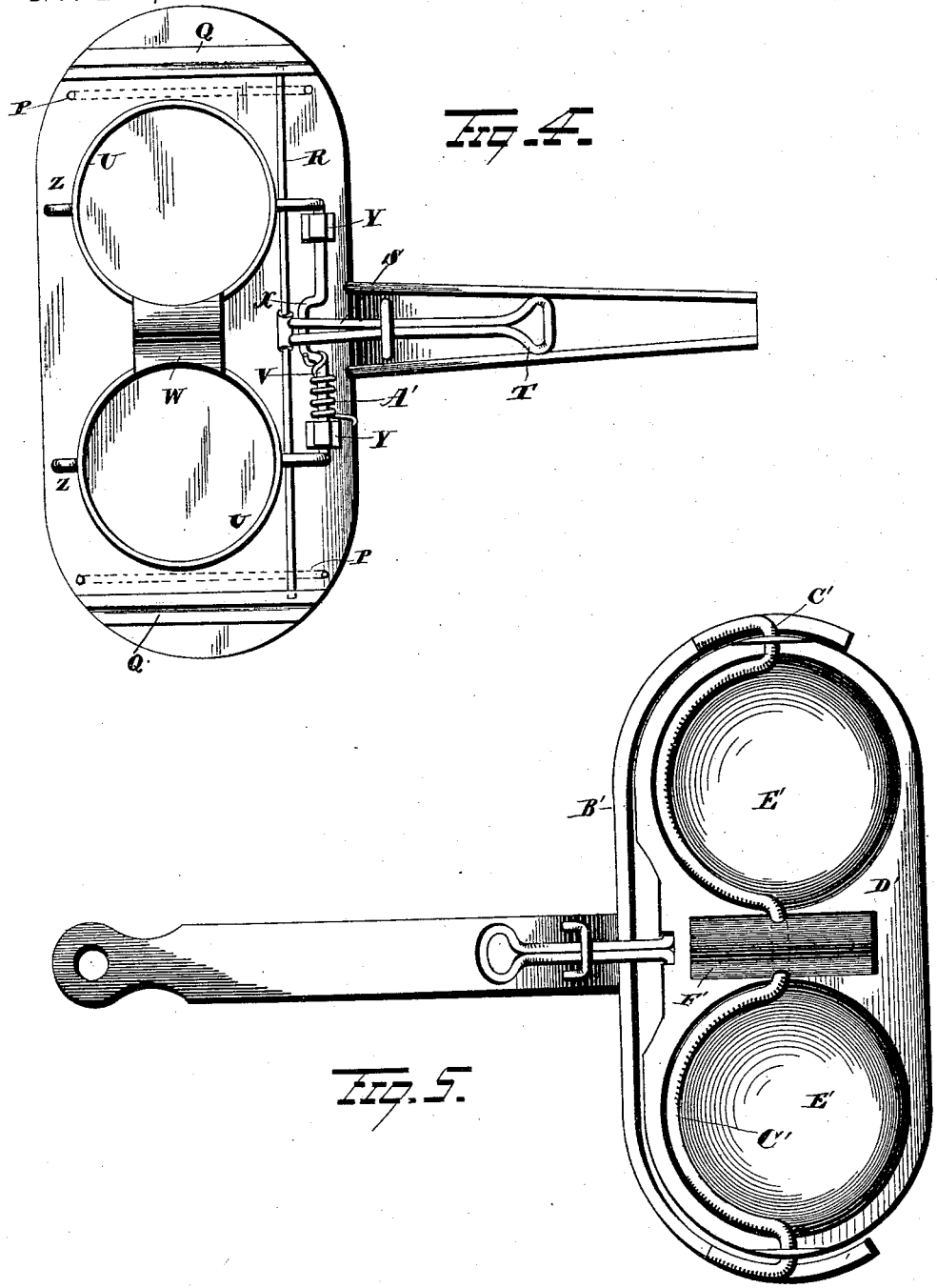

UNITED STATES PATENT OFFICE.

JOHN CAMPBELL, OF WALDEN, NEW YORK.

COOKING-UTENSIL.

SPECIFICATION forming part of Letters Patent No. 284,608, dated September 11, 1883.

Application filed May 25, 1883. (No model.)

*To all whom it may concern:*

Be it known that I, JOHN CAMPBELL, of Walden, in the county of Orange and State of New York, have invented certain new and useful Improvements in Cooking-Utensils; and I do hereby declare the following to be a full, clear, and exact description of the invention, such as will enable others skilled in the art to which it appertains to make and use the same.

My invention relates to culinary utensils, and more particularly to an improved apparatus for cooking eggs, the object being to provide a device of this character which will combine cheapness and simplicity of construction and ease of operation with durability and efficiency in use.

With these objects in view my invention consists in certain details of construction and combinations of parts, as will be hereinafter described, and pointed out in the claims.

Figure 3:
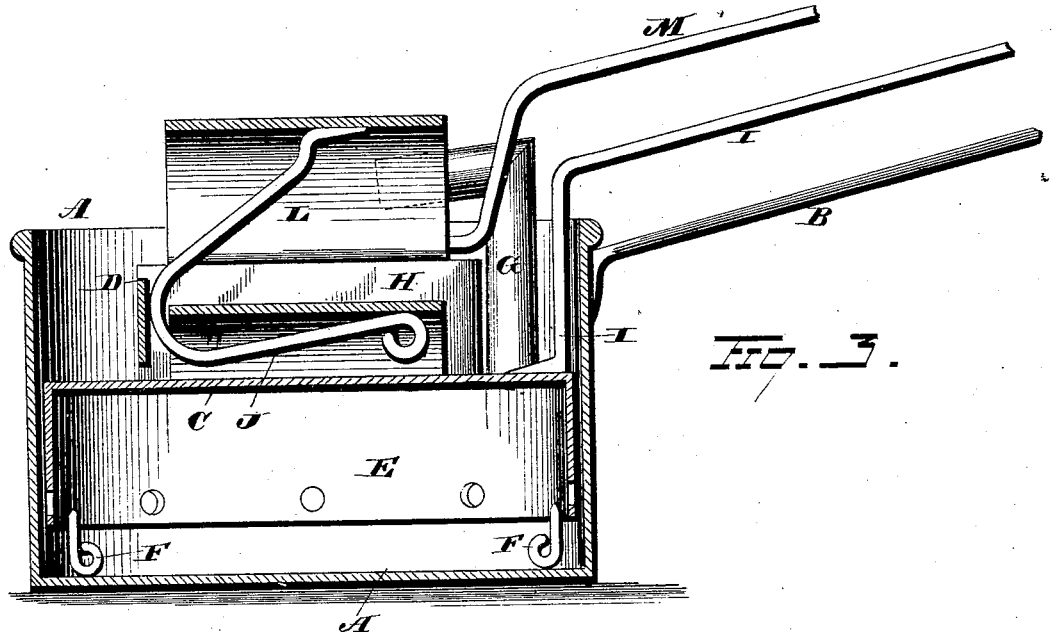
Figure 5:
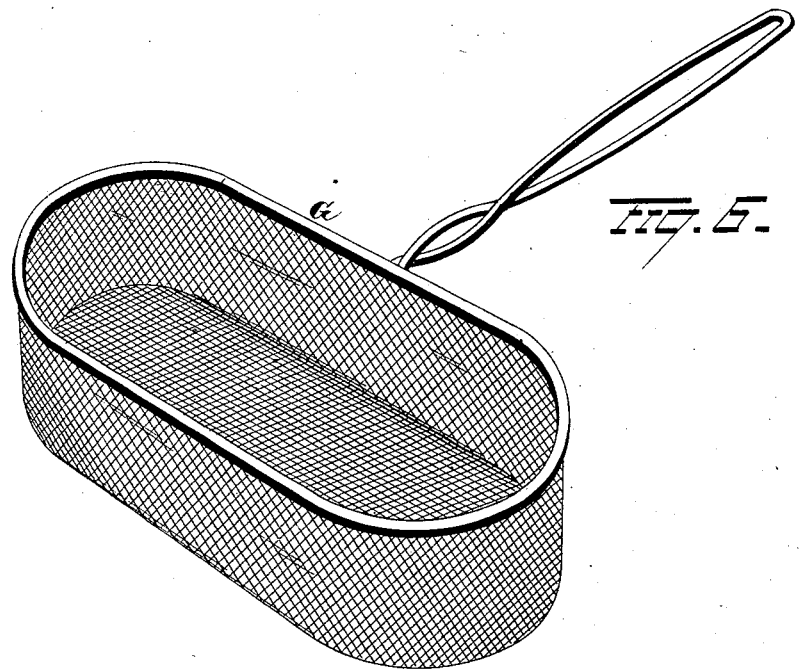

In the accompanying drawings, Figure 1 is a view in perspective of the water-pan. Fig. 2 is a similar view of the poacher. Fig. 3 is a view thereof in vertical section. Figs. 4 and 5, respectively, represent modified forms which the poacher may assume; and Fig. 6 is a view of a wire basket to be used for boiling eggs.

The water-pan A, which is provided with a handle, B, is designed to be set upon the stove, and adapted to receive the poacher, the same being covered by the water in the pan. The said poacher consists, essentially, of a flat plate or poaching-surface, C, and of a retainer and remover, D. The plate C is supported above the bottom of the pan A by means of a perforated depending flange, E, which is provided with feet F, whereby the water is permitted to circulate freely in the pan. The desired circulation will, however, result if the flange is not perforated, so long as it is supported above the bottom of the water-pan by feet or otherwise. On the other hand, the same effect will be obtained by using a perforated flange and setting it on the bottom of the water-pan. If desired, also, supports located in the pan may be employed to hold the flange above the bottom thereof. Pipes G, secured to the plate C and opening downward into the pan, are designed to eject boiling water and steam upon the upper portions of the eggs, thereby cooking them evenly. The number of these pipes will be proportional to the number of eggs to be cooked at once, and in an apparatus having a capacity for cooking a large number of eggs the pipes will be preferably located in and attached to the pan A. A sleeve, H, secured to the upper face of the plate C and located in front of the handle I, is adapted to receive the spring-arm J of the container and remover D and hold the same in place upon the plate C while the eggs are being cooked. The said container and remover is provided with two frames, K, which are located on opposite sides of the egg-breaker L, to which the handle M is attached. The lower edges of these frames engage at every point with the surface C, and thus confine the eggs to the inclosed portions thereof. In shape the frames may vary as fancy may dictate, my invention not being limited in this respect to the forms shown. In number the frames are proportional to the number of eggs to be cooked by the apparatus at one time. When cooked, the eggs are removed from the surface C by suitable devices located within the frames, two devices for this purpose being shown in Fig. 2 of the drawings. One device consists of an inclined plate, N, having its lower edge in contact with the surface, while the other consists simply in a wire, O, or its equivalent, also in contact with the said surface.

The operation of cooking or poaching eggs with my apparatus consists in first filling the pan A about half full of water and setting the poacher into it, the water rising over the poaching-surface C. When the water boils, the eggs are broken into the respective frames, being speedily cooked by the action of the body of the water in the pan and by the streams of water and steam ejected upon them by the pipes G. As soon as the eggs are done the poacher is removed from the pan to a side table, where the eggs are transferred to the dish in which they are to be served by carefully sliding the container and remover from the surface C.

In the modification shown in Fig. 4 of the drawings frames P are employed to support the poaching-surface, which is provided with two guides, Q, arranged to receive the ends of the wire remover R, the same being operated by a handle, T, having a bend, S, located near its outer end. The circular frames U are held together by a wire frame, V, and by the egg-breaker W. The said frame, which is provided with a loop, X, is mounted in bearings Y, secured to the rear edge of the poaching-surface. Lifters Z, attached to the outer faces of the frames, are designed to lift them sufficiently to allow the remover to pass under their edges, as will be hereinafter explained. A coiled spring, A', encircling one arm of the frame V, and having its ends respectively attached to the frame and to the poaching-surface, is designed to hold the frames U in normal engagement with the said surface. In using this form of poacher the remover is stationed in front of the frames while the eggs are cooking. When done, the eggs are disengaged from the poaching-surface by drawing the remover under the frames U by the handle S, the frames being elevated to allow the remover to pass under them by its engagement with the lifters Z. As soon as the eggs are completely disengaged from the poaching-surface the bend S of the handle T engages with the loop X of the frame V, which is turned in its bearings with the effect of raising the frames U and allowing the eggs to slip from the poaching-surface.

The device shown in Fig. 5 of the drawings consists, essentially, of a standard, B', provided with a bent wire frame, C', from which the egg-receiver D' is suspended. The said receiver is provided with two cups, E', with an egg breaker, F', and with a reversing-handle. The frame C' aforesaid is bent to conform to the contour of the cups, and operates to remove the eggs therefrom when the receiver is reversed or inverted.

The egg-boiler G (shown in Fig. 6 of the drawings) consists of a wire basket adapted in form to be set into the pan A. When the eggs are done, the basket is removed from the pan, the eggs quickly drying for serving.

While the poachers herein shown are adapted to cook only two eggs at a time, it is apparent that they may be increased in capacity as desired.

I would have it understood that I do not limit myself to the exact construction shown and described, but hold myself at liberty to make such changes and alterations as fairly fall within the spirit and scope of my invention.

Having fully described my invention, what I claim as new, and desire to secure by Letters Patent, is—

1. In a device for cooking eggs, the combination, with a water-pan, of a removable poacher adapted to be supported in said pan, and provided with means for disengaging the eggs from its surfaces when cooked, substantially as set forth.

2. In an egg-poaching utensil, the combination, with a water-receptacle, of a removable poaching table or support adapted to be set in said pan, and an open bottom frame adapted to be seated upon the top of the poaching table or support, and to be moved laterally thereon in removing the eggs when cooked, substantially as set forth.

3. In a device for cooking eggs, the combination, with a water-pan, of a removable poaching-surface adapted to be supported in said pan, frames to confine the eggs on the said surface, and means to disengage the eggs therefrom when cooked, substantially as set forth.

4. In a device for cooking eggs, the combination, with a water-pan, of a removable poacher adapted to be supported in the pan, and a device for breaking the eggs, substantially as set forth.

5. In a device for cooking eggs, the combination, with a water-pan, of a removable poacher adapted to be supported in the pan, removable frames to confine the eggs upon the poacher, and means associated with said frames to disengage the eggs from the poacher when cooked, substantially as set forth.

In testimony whereof I have signed this specification in the presence of two subscribing witnesses.

JOHN CAMPBELL.

Witnesses:
W. G. RUTHERFORD,
JAS. L. CRAWFORD.